United States Patent
Keeler et al.

(10) Patent No.: US 9,567,538 B2
(45) Date of Patent: Feb. 14, 2017

(54) TWO STAGE GASIFICATION WITH DUAL QUENCH

(71) Applicant: Lummus Technology Inc., Bloomfield, NJ (US)

(72) Inventors: Clifton G. Keeler, Spring, TX (US); Chancelor L. Williams, Katy, TX (US); Ivan O. Bustamante, Richmond, TX (US)

(73) Assignee: Lummus Technology Inc., Bloomfield, NJ (US)

( * ) Notice: Subject to any disclaimer, the term of this patent is extended or adjusted under 35 U.S.C. 154(b) by 58 days.

(21) Appl. No.: 14/411,015

(22) PCT Filed: Jun. 26, 2013

(86) PCT No.: PCT/US2013/047851
§ 371 (c)(1),
(2) Date: Dec. 23, 2014

(87) PCT Pub. No.: WO2014/004646
PCT Pub. Date: Jan. 3, 2014

(65) Prior Publication Data
US 2015/0299590 A1    Oct. 22, 2015

Related U.S. Application Data

(60) Provisional application No. 61/664,415, filed on Jun. 26, 2012.

(51) Int. Cl.
*C10J 3/72* (2006.01)
*C10K 1/02* (2006.01)
(Continued)

(52) U.S. Cl.
CPC .............. *C10J 3/721* (2013.01); *C10J 3/466* (2013.01); *C10J 3/485* (2013.01); *C10J 3/84* (2013.01);
(Continued)

(58) Field of Classification Search
CPC ....... C10J 3/721; C10J 3/84; C10J 2300/0943; C10J 3/485; C10J 2200/09; C10J 3/466; C10K 3/008; C10K 1/04; C10K 3/04; C10K 1/024; C10K 1/005; C10K 3/003; C10K 1/101; Y02E 20/18; Y02E 20/16
See application file for complete search history.

(56) References Cited

U.S. PATENT DOCUMENTS 4,069,024 A    1/1978    Fernandes
4,872,886 A    10/1989   Henley et al.
(Continued)

FOREIGN PATENT DOCUMENTS

WO    2006117355 A1    11/2006
WO    2010019319 A2    2/2010

OTHER PUBLICATIONS

International Search Report issued in PCT/US2013/047851 mailed on Oct. 18, 2013 (2 pages).
(Continued)

*Primary Examiner* — Stanley Silverman
*Assistant Examiner* — Syed Iqbal
(74) *Attorney, Agent, or Firm* — Osha • Liang LLP

(57) ABSTRACT

Improved two-stage entrained-flow gasification systems and processes that reduce the cost and complexity of the design and increase the reliability, while maintaining the efficiency by implementing a first chemical quench followed by a second water quench of the produced syngas. The quenched syngas is maintained above the condensation temperature of
(Continued)

at least one condensable component of the syngas, allowing residual particulates to be removed by dry particulate filtration.

18 Claims, 2 Drawing Sheets

(51) Int. Cl.
| | |
|---|---|
| C10K 3/04 | (2006.01) |
| C10J 3/48 | (2006.01) |
| C10K 1/10 | (2006.01) |
| C10J 3/46 | (2006.01) |
| C10J 3/84 | (2006.01) |
| C10K 1/00 | (2006.01) |
| C10K 1/04 | (2006.01) |
| C10K 3/00 | (2006.01) |

(52) U.S. Cl.
CPC ............... *C10K 1/005* (2013.01); *C10K 1/024* (2013.01); *C10K 1/04* (2013.01); *C10K 1/101* (2013.01); *C10K 3/008* (2013.01); *C10K 3/04* (2013.01); *C10J 2200/09* (2013.01); *C10J 2300/0943* (2013.01); *C10K 3/003* (2013.01); *Y02E 20/16* (2013.01); *Y02E 20/18* (2013.01)

(56) References Cited

U.S. PATENT DOCUMENTS

| | | | |
|---|---|---|---|
| 5,415,673 | A | 5/1995 | Hilton et al. |
| 6,141,796 | A | 11/2000 | Cummings |
| 7,959,829 | B2 | 6/2011 | Breton et al. |
| 8,088,188 | B2 | 1/2012 | Breton et al. |
| 8,211,191 | B2 | 7/2012 | Douglas et al. |
| 8,268,023 | B2 * | 9/2012 | Anand ............... C01B 3/48 |
| | | | 423/644 |
| 8,685,119 | B2 | 4/2014 | Van Den Berg et al. |
| 8,888,876 | B2 | 11/2014 | Tsang et al. |
| 8,951,313 | B2 * | 2/2015 | Zhou ............... C10K 1/04 |
| | | | 423/644 |
| 2010/0037518 | A1 * | 2/2010 | Tsang ............... C10J 3/466 |
| | | | 48/76 |
| 2010/0132257 | A1 | 6/2010 | Agrawal et al. |
| 2010/0148122 | A1 | 6/2010 | Breton et al. |
| 2010/0155669 | A1 | 6/2010 | Tsang et al. |
| 2010/0181537 | A1 | 7/2010 | Tsang et al. |
| 2010/0251614 | A1 | 10/2010 | Ji |
| 2011/0168947 | A1 | 7/2011 | Ji et al. |

OTHER PUBLICATIONS

Written Opinion of the International Searching Authority issued in PCT/US2013/047851 mailed on Oct. 18, 2013 (5 pages).
Official Action (w/translation) dated Dec. 22, 2015 in corresponding Japanese application No. 2015-520430 (5 pages).
Extended European Search Report dated Apr. 8, 2016 in corresponding European application No. 13810468.2 (9 pages).
Office Action issued Mar. 29, 2016 in corresponding Canadian application No. 2,877,691 (4 pages).
Decision of Rejection issued Apr. 12, 2016 in corresponding Japanese application No. 2015-520430 (w/translation) (5 pages).
Second Office Action issued Jun. 7, 2016 in corresponding Chinese application No. 201380033902.9 (w/translation) (7 pages).
Corresponding reporting Office Action issued Jun. 17, 2016 in corresponding Colombian application No. 14-284.179 (26 pages).

* cited by examiner

TWO STAGE GASIFICATION WITH DUAL QUENCH

FIELD OF THE INVENTION

The present invention relates to a gasification system and process that converts carbonaceous feedstock into desirable gaseous products such as synthesis gas. More specifically, the present disclosure relates to improved systems and processes that reduce the cost and complexity of the design and increase the reliability, while maintaining the efficiency of a two-stage entrained-flow gasification system. This is accomplished by implementing a chemical quench followed by a second quench of the raw syngas.

BACKGROUND

The present invention relates to a gasification system and process for converting generally solid feedstock such as carbonaceous material into desirable gaseous products such as synthesis gas. Gasification processes are widely used to convert solid or liquid feedstocks such as coal, petroleum coke and petroleum residue into synthesis gas. Synthesis gas (or syngas) comprises mainly hydrogen gas and carbon monoxide, and is used both for power generation, as well as a feedstock for producing chemicals including methanol, ammonia, synthetic natural gas and synthetic transportation fuels.

The three basic types of processes that exist for the gasification of carbonaceous materials include: (1) fixed-bed gasification, (2) fluidized-bed gasification and (3) suspension/entrainment gasification. The majority of advanced gasification processes in use today utilize suspension or entrainment gasification. The present invention relates to an entrained gasification system and process for gasifying carbonaceous materials.

Suspension/entrainment gasification may be further defined as having either one or two stages for feedstock entry. All gasification reactor designs include a first reactor stage where carbonaceous feedstock and an oxidant are fed and partially combusted to create products comprising synthesis gas and slag. The resulting raw syngas usually contains only a residual level of volatile tars. The raw syngas exiting these single stage gasification processes is often at a temperature exceeding 2500° F., and requires that much of the sensible heat in the gas be removed prior to further clean-up or use. This typically is achieved by heat exchange in a high temperature heat recovery unit (HTHRU), by quenching with cool syngas, or by direct water quenching.

In certain two-stage gasification processes, an alternative, chemical quench is utilized to recover heat from the raw syngas, while simultaneously increasing the heating value of the syngas. This chemical quench includes a second gasification stage, where a second portion of carbonaceous feedstock is reacted in a low oxygen environment with the raw syngas mixture created in the first stage. The heat generated in the first stage drives endothermic chemical reactions in the second stage to generate additional syngas from this second portion of feedstock. Feeding the second portion of feedstock to the reactor as a slurry with water also assists in increasing the heating value of the product syngas, while serving to further quench the temperature of the raw syngas, thereby decreasing the amount of heat that must be later recovered in a high temperature heat recovery unit (HTHRU). A disadvantage of such two-stage gasification processes is that they often result in a higher level of volatile tar in the raw syngas versus one-stage processes. These tars must be removed to prevent harmful emissions to the environment, as well as fouling of downstream syngas processing equipment (including the HTHRU). One solution that has been utilized to eliminate such tars is to first direct the raw syngas through a residence vessel that allows sufficient high temperature residence time for the tars to thermally "crack" into smaller hydrocarbon compounds.

As mentioned above, to increase overall gasification process efficiency, sensible heat in the raw syngas produced in both single-stage and two-stage gasification processes is often recovered using one or more HTHRU. However, these units are expensive to build and install and require regular maintenance to manage fouling. To reduce costs, some manufacturers of single-stage gasification systems have alternatively implemented a complete water quench of the raw syngas produced in their single-stage reactor as a means to allow elimination of the HTHRU. However implementing an immediate water quench is precluded in two-stage gasification systems by the need to remove the residual tars created during pyrolysis of the slurrified feedstock added in the second-stage. Thermal cracking of these tars requires temperatures above about 1500° F. Additionally, fully water quenching the raw syngas creates contaminated "black water" that requires expensive clean-up processes to prevent pollution of the environment, and often necessitates that the quenched raw syngas be reheated prior to further clean-up and water-gas shifting the syngas to increase hydrogen content.

What is needed are improvements to two-stage gasification systems and processes that can simultaneously: 1) reduce the cost required to build and install such systems, while maintaining the efficiency, thereby reducing operational expenditure, 2) maintain near-zero levels of tar in the produced syngas, 3) moisturize syngas in preparation for water-gas shift without resorting to using process steam, expensive boiler feed water, or complete immersion quenching, and 4) increase overall system reliability, thereby decreasing downtime.

BRIEF SUMMARY OF THE DISCLOSURE

The processes and systems disclosed herein provide a unique two-step quench of hot syngas produced by gasification of a particulate carbonaceous material. The first quench is predominantly a chemical quenching, wherein the heat evolved in a first reaction zone is utilized to gasify an additional portion of carbonaceous feedstock via predominantly endothermic devolatilization and pyrolysis reactions in a second reaction zone. The second quench is performed after residual tars (produced during the first quench) have been thermally cracked (or degraded), to thereby prevent these tars from fouling downstream process equipment or creating toxic emissions.

After the second quench, residual solids, fines and particulates are removed from the cooled moisturized syngas by conveying the syngas through the particulate filtering device at a temperature that is sufficient to prevent the condensation of at least one component present in the cooled syngas, thereby preventing the deposition of the at least one component onto the surfaces of the particulate filtering device. The at least one component may be, for example, water, residual volatile tars, or one or more ash constituents.

Certain embodiments comprise a two-stage non-catalytic gasification process, comprising: (a) providing a two-stage gasification reactor comprising a reactor upper section and a reactor lower section; (b) introducing a particulate carbonaceous feedstock into the reactor lower section and partially combusting it with a gas stream comprising an oxygen supply selected from a group consisting of oxygen-containing gas, steam, and mixtures thereof, thereby evolving heat and forming a first product stream comprising synthesis gas and molten slag; (c) passing the synthesis gas of step (b) into the reactor upper section and contacting it with a stream comprising a slurry of particulate carbonaceous feedstock in a liquid carrier, thereby forming a second product stream comprising syngas and solids comprising ash and char; (d) passing the second product stream to a reactor that is maintained at a temperature greater than about 1500° F., where the syngas resides in the reactor for a time that is sufficient to thermally degrade volatile tars present in the syngas, thereby producing a product comprising an near-zero-tar syngas; (e) introducing a water stream and contacting it with the near-zero-tar syngas, thereby producing steam and a cooled moisturized syngas, where the temperature of the cooled, moisturized syngas remains greater than the condensation point of the steam, but less than about 1200° F.; (f) removing residual solids, fines and particulates from the cooled syngas by directing the cooled syngas through a particulate filtering device, thereby producing a low-particulate syngas.

Optionally, the inventive process may additionally comprise routing the low-particulate syngas to a reactor and reacting at least a portion of the carbon monoxide present in the syngas and the steam produced in step (e) in the presence of a catalyst to produce carbon dioxide and hydrogen gas, thereby producing a shifted syngas.

Certain embodiments comprise a system for the two-stage gasification of a particulate carbonaceous feedstock, the system comprising: (a) a gasification reactor comprising a reactor upper section and a reactor lower section adapted for operation at pressures greater than about 100 psig and temperatures greater than about 2000° F., where the reactor lower section is adapted for introducing the particulate carbonaceous feedstock and an oxygen containing gas or steam and partially combusting therein to form mixture products, where the gasification reactor is adapted for conveying the mixture products from the lower reactor section to the upper reactor section; where the reactor upper section is adapted for introducing additional particulate carbonaceous feedstock in a liquid carrier and combining it with the mixture products to endothermically produce a product stream comprising syngas, char, ash and volatile tars; (b) a residence vessel located downstream from the gasification reactor that is adapted for accepting the product stream and operating at a pressure greater than about 100 psig and a temperature greater than about 1500° F., and adapted for providing sufficient residence time for the product stream conveyed through it to allow thermal degradation of a majority of the volatile tars present in the reduced particulate syngas; (c) a conduit comprising at least one inlet that is located immediately downstream from the residence vessel and connected to the residence vessel, where the at least one inlet is adapted for introducing a water stream and mixing the water stream with the reduced particulate syngas conveyed through it; (d) a particulate filtering device located immediately downstream from the conduit and connected to the conduit, where the particulate filtering device is adapted for removing residual solids, fines and particulates from the reduced particulate syngas passing through it, thereby producing a particulate-free syngas.

Optionally, certain embodiments additionally comprise a water gas shift reactor located downstream from the particulate filtering device and connected to the particulate filtering device, where the shift reactor comprises a catalyst and is adapted for operating at a temperature in a range of about 400° F. to 900° F., and for reacting carbon monoxide and steam present in the particulate-free syngas passing through it, thereby producing a particulate-free shifted syngas.

BRIEF DESCRIPTION OF THE DRAWINGS

A more complete understanding of the present invention and benefits thereof may be acquired by referring to the follow description taken in conjunction with the accompanying drawings in which.

Figure 1:
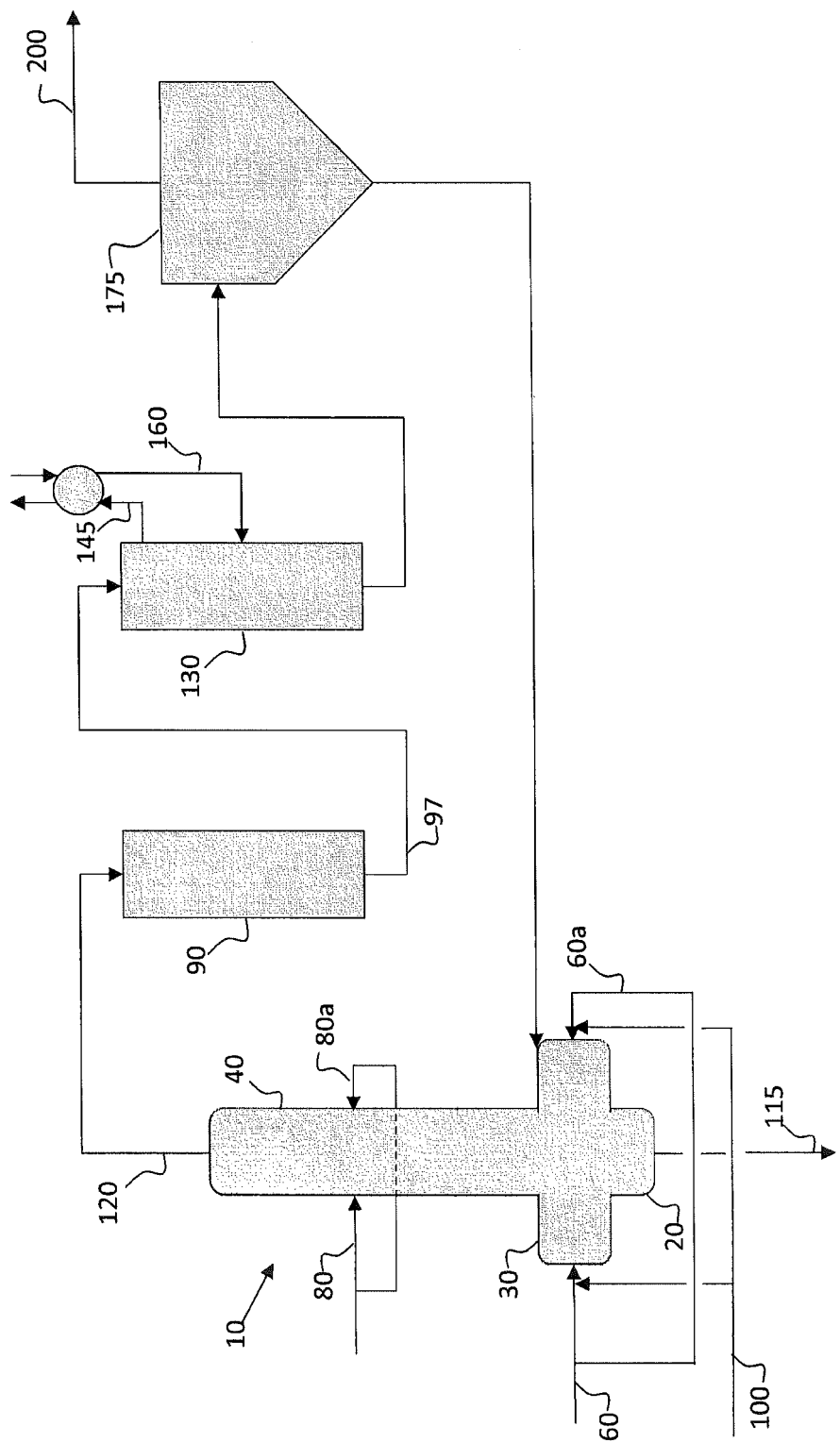
FIG. 1 is a flow diagram of a conventional two-stage gasification system.

The invention is susceptible to various modifications and alternative forms, specific embodiments thereof are shown by way of example in the drawings. The drawings may not be to scale. It should be understood that the drawings and their accompanying detailed descriptions are not intended to limit the scope of the invention to the particular form disclosed, but rather, the intention is to cover all modifications, equivalents and alternatives falling within the spirit and scope of the present invention as defined by the appended claims.

DETAILED DESCRIPTION

The disclosure provided herein pertains to two-stage non-catalytic gasification processes and systems, wherein a first quantity of carbonaceous feedstock is partially combusted in a first stage, to form mixture products (including syngas) that are then conveyed to a second stage to be contacted with a second quantity of feedstock in a low oxygen environment. This second stage uses a portion of the heat generated from combustion in the first stage to generate additional syngas in the second stage, but also results in a higher level of volatile tar in the raw syngas as compared to one-stage gasification processes.

The details of the gasification process are well-known in the art, and therefore, are described herein only in the detail required to fully disclose the present invention. In certain embodiments, the present invention builds upon the disclosures of U.S. Pat. Nos. 4,872,886A, 7,959,829B2, and 8,088,188B2 and 8,211,191B2, as well as U.S. Patent Application Publications US2010/0251614A1, US2010/0181537A1 and US2010/0037518A1, which are all hereby incorporated by reference in their entirety.

To better distinguish the present inventive disclosure, reference is first made to a conventional two-stage gasification reactor system that comprises first and second reaction zones (depicted in FIG. 1). The reactor lower-section 30 defines a first reaction zone, while a reactor upper-section 40 defines a second reaction zone. The unfired reactor upper-section 40 of the reactor 10 is directly attached to the top of the fired reactor lower-section 30 of the reactor 10 so that the mixture products of the first reaction zone are conveyed directly from the reactor lower-section 30 to the second reaction zone of the reactor upper-section 40.

In this conventional gasification reactor design and process (FIG. 1), the product stream 120 leaving the reactor upper section 40 of the gasification reactor 10 is routed to a residence vessel 90 for thermal degradation/cracking of un-reacted volatile tars. Upon exiting the residence vessel 90 via conduit 97, the syngas enters a High Temperature Heat Recovery Unit (HTHRU) 130 for further cooling while simultaneously generating high-pressure saturated steam. In the HTHRU, the syngas is cooled to a temperature of about 600-800° F. The shell-side of the boiler is supplied with high pressure boiler feed water 160, and saturated steam exits the boiler shell-side through a series of risers 145. Upon exiting the HTHRU, the cooled syngas is passed through a particulate filtering device 175 to remove residual char and ash and produce a particulate free syngas 200.

Figure 2:
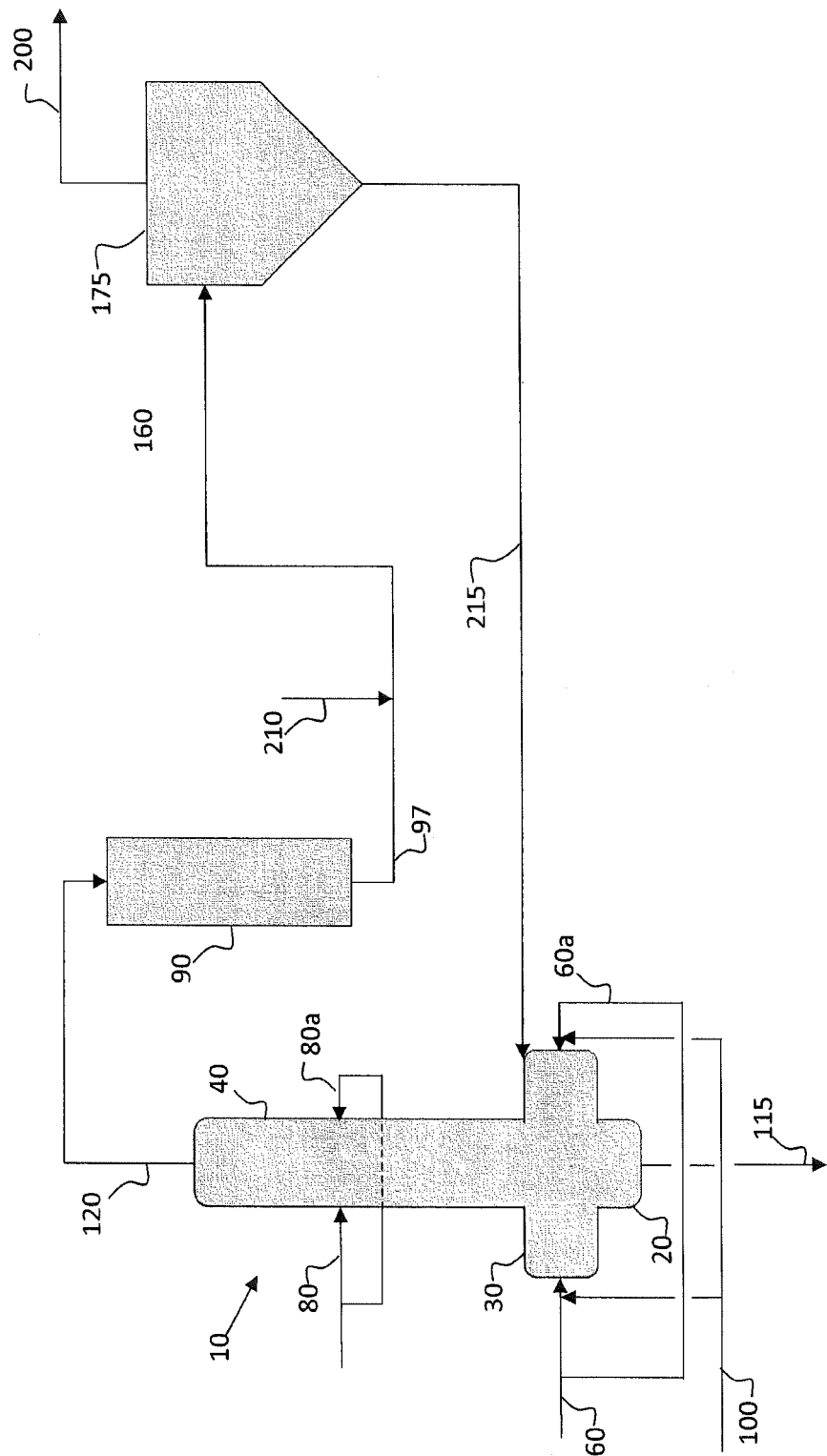
FIG. 2 is a simplified schematic of an embodiment of the present disclosure.

Certain embodiments of the current disclosure also comprise a system for the two-stage gasification of a particulate carbonaceous feedstock. FIG. 2 illustrates an embodiment in greater detail. A gasification reactor system is depicted that produces a raw syngas through a two-stage gasification process. The reactor is typically adapted for operation at pressures greater than about 100 psig and temperatures greater than about 2000° F., although the pressure may be as high as 1200 psig and the operating temperature up to about 3000° F. The reactor lower section comprises at least two devices capable of introducing a particulate carbonaceous feedstock and oxygen containing gas or steam. Such devices may be, for example, dispersion devices as are familiar to those having skill in the art.

Similar to the system and process depicted in FIG. 1, the gasification reactor is adapted for conveying the mixture products from the lower reactor section 30 to the upper reactor section 40, and also adapted for introducing a second feed of particulate carbonaceous feedstock in a liquid carrier via one or more inlets (80 and/or 80a). Such inlets may be a dispersion device such as used in the reactor lower section, or a simple feeding tube. The second feed contacts and mixes with the mixture products rising from the first reaction zone 30 to produce a second product stream comprising syngas, char, ash and volatile tars. The reactor upper section additionally comprises an outlet and conduit 120 for conveying the second product stream out of the upper reactor section 40 and to a residence vessel 90.

The residence vessel 90 is adapted for accepting the product stream 120 from the reactor upper section 40 and providing sufficient residence time at a temperature exceeding about 1500° F. for thermal degradation/cracking of un-reacted volatile tars present in the raw gas stream passing therethrough. In certain embodiments, the residence vessel may be replaced by a reactor comprising one or more catalysts capable of catalyzing the destruction of tar, one or more sorbents capable of adsorbing residual tar, or both. The syngas leaving the residence vessel 90 comprises negligible levels of tar, and is thus hereinafter termed a "near-zero tar syngas". The residence vessel 90 is designed to withstand operating pressures that are similar to those utilized within the gasification reactor 10.

In the embodiment depicted in FIG. 2, a conduit 97 conveys the near-zero tar syngas directly from the residence vessel 90 outlet to the particulate filtering device 175. A quenching medium, such as water, is introduced via at least one inlet 210 located on this connecting conduit 97. The inlet 210 may be of any design that allows passage of the quenching medium into a pressurized system. In certain embodiments, the inlet 210 is adapted for introducing a water stream and mixing the water stream with the reduced particulate syngas conveyed through the conduit 97. Spray nozzles and dispersion devices are commercially available that can perform such function and can be implemented by one having skill in the art.

The quenching medium contacts the near-zero-tar syngas after it has exited the residence vessel 90 and is being conveyed via conduit 97 to the particulate filtering device 175. The direct contact between the quenching medium and the near-zero-tar syngas takes advantage of the latent heat of vaporization of the quenching medium by flashing the quenching medium to vapor, thereby producing a cooled, moisturized syngas that has a temperature in a range of between about 550° F. and about 1200° F. In certain embodiments, the temperature of the cooled moisturized syngas is between about 600° F. and about 1100° F. In certain embodiments, the temperature of the cooled moisturized syngas is between about 450° F. and about 1000° F. In certain embodiments, the temperature of the cooled moisturized syngas is between about 550° F. and about 950° F. In certain embodiments, the temperature of the cooled moisturized syngas is between about 600° F. and about 950° F.

Further referring to FIG. 2, the gasification process within the two-stage gasification system begins within the first reaction zone (or reactor lower-section 30), when a particulate carbonaceous feedstock 60 and/or 60a is mixed with a gas stream comprising an oxygen-containing gas 100 and/or steam and a rapid exothermic reaction takes place in which a first portion of particulate solid carbonaceous feedstock is converted into a first mixture product comprising steam, hydrogen, carbon monoxide, carbon dioxide, methane, and entrained particulates such as ash (see Table 1). Ash is comprised of the non-combustible mineral content of the carbonaceous feedstock. The temperature of the reactor lower section 30 is maintained higher than the ash melting point, which allows the ash to melt and agglomerate to form a viscous liquid known as slag. The slag falls to the bottom of the first reaction zone, flows through a tap hole 20 and into a slag quench chamber (not depicted), whereupon it is water-quenched and directed via an outlet for slag processing and final disposal 115.

Exothermic combustion reactions occurring in the reactor lower section 30 raise the temperature to between 2000° F. and 3000° F. This heat is carried upward to the second reaction zone 40 (or reactor upper section) and provides heat for the endothermic devolatilization and pyrolysis, or optionally, the drying of a second portion of particulate solid carbonaceous feedstock in a liquid carrier that is introduced into the second reaction zone 40 via inlets 80 and/or 80a.

The physical conditions in the second reaction zone 40 are controlled to assure rapid heating of the carbonaceous feedstock. As the carbonaceous feedstock enters the reactor upper-section 40, it comes into contact with the hot first product stream rising from the first reaction zone (not depicted). The feedstock is dried as the liquid carrier vaporizes, and a portion of the feedstock is gasified via endothermic reactions such as the carbon steam reaction ($C+H_2O \rightarrow CO+H_2$) to produce a second product stream comprising syngas and solids comprising ash, and devolatilized carbon (char). In certain embodiments, the second product stream may additionally comprise dried, unreacted feedstock.

Further referring to FIG. 2, the second product stream exiting the reactor upper section 40 of the gasification reactor 10 via conduit 120 predominantly comprises carbon monoxide (CO), carbon dioxide ($CO_2$), hydrogen ($H_2$), water ($H_2O$), methane ($CH_4$), ash, char, and nitrogen ($N_2$). Table 1 depicts the typical composition of the raw synthesis gas stream produced by a conventional two-stage slurry-fed gasifier of the E-Gas™ configuration (owned by Lummus Technology Inc.). The second product stream typically comprises one or more undesirable components (i.e., contaminants) such as, for example volatile tars created by the endothermic reactions occurring in the second stage/second reaction zone.

TABLE 1

Components in Raw Gas Stream
(based on total stream volume)

| Component | Broad Range | Intermediate Range | Narrow Range |
|---|---|---|---|
| $H_2$ | 8-50 vol % | 10-40 vol % | 15-35 vol % |
| CO | 10-75 vol % | 15-60 vol % | 25-50 vol % |
| $CO_2$ | 1-40 vol % | 5-30 vol % | 7-20 vol % |
| $H_2O$ | 4-40 vol % | 8-30 vol % | 10-25 vol% |
| $H_2S$ | 0.001-5 vol % | 0.1-2.5 vol % | 0.5-2 vol % |
| $CH_4$ | 0.05-10 vol % | 0.1 to 7.5 vol % | 0.5 to 5.0 vol % |
| COS | 100-5,000 ppmv | 200-2,500 ppmv | 350-1,500 ppmv |
| HCl | 1-1,000 ppmv | 5-500 ppmv | 10-100 ppmv |
| $NH_3$ | 50-2,500 ppmv | 100-1,750 ppmv | 250-1,500 ppmv |
| Other (total) | <2.5 vol % | <2.0 vol % | <1 vol % |
| Volatile Tar | 0-20 ppmv | 2-10 ppmv | 3-6 ppmv |

A benefit of processes and systems disclosed herein is that the water stream utilized as quenching medium can be of lower quality than the boiler feed water that otherwise would be necessary to produce high-pressure steam in a HTHRU for injection into, or immediately upstream from, the water-gas shift reactor. High purity water must be fed to a HTHRU to prevent fouling of the heat transfer surfaces. Eliminating the need for a HTHRU increases overall efficiency of the process and system by reducing the amount of high-purity boiler feed water required, thereby eliminating or reducing the size of water treatment equipment that would otherwise be needed.

Further referring to FIG. 2, the cooled, moisturized syngas is conveyed through conduit 97 a particulate filtering device 175 to remove residual solids, fines and particulates from the syngas passing therethrough, thereby producing a particulate-free syngas 200. Filtration may be achieved through any conventional filtration means, such as, for example, a cyclone, bag filter or candle filter. The use and construction of these devices is conventional, and a more detailed discussion is outside the scope of the current disclosure.

Conveying the cooled, moisturized syngas through the particulate filtering device 175 is performed at a temperature that is greater than the condensation temperature of one or more components present in the cooled syngas and prevents the condensation of the one or more components that are selected from the group consisting of: water, ash constituents, and residual volatile tars. The systems and processes disclosed herein may optionally be utilized to prevent condensation of ash constituents that remain in gaseous phase at temperatures above 800° F. At slightly higher temperatures (above about 1000° F.) the inventive systems and methods may prevent the condensation of any residual volatile tars and the subsequent deposition of these tars onto the surfaces of the particulate filtering device as the cooled, moisturized syngas is filtered through them.

In certain embodiments, the temperature of the cooled, moisturized syngas is about 800° F. or less, such that conventional filtration elements constructed from steel alloys can be utilized in the particulate filtering device. However, in these embodiments, the temperature of the cooled, moisturized syngas is always controlled such that it remains above the condensation temperature (or dew point) of steam present in the syngas, as this would blind and/or corrode any particulate filtering device that operates by dry filtration. In certain alternative embodiments where the temperature of the cooled, moisturized syngas remains above about 800° F., the particulate filtration device 175 may comprise filtration elements constructed from more heat resistant materials that may include, for example, porous ceramics or any other heat-resistant materials known to those having skill in the art. Optionally, any residual solids, fines and particulates that are captured by the particulate filtering device 175 are returned to the reactor lower section via a conduit 215 to increase the overall efficiency of the process.

The particulate-free syngas 200 exiting the particulate filtering device may be optionally conveyed to a conventional chloride scrubber (not depicted) to remove chlorides and other impurities. In certain embodiments, the particulate free syngas 200 is conveyed to at least one shift reactor (not depicted) that facilitates the water-gas shift reaction: $CO+H_2O \rightarrow CO_2+H_2$, thereby producing a shifted syngas. When a water stream is used as the quenching medium that is introduced via at least one inlet 200, steam is produced in situ, and this reduces the quantity of high pressure steam that must be produced by an external boiler and introduced either into, or immediately upstream from, the shift reactor in order to facilitate the water-gas shift reaction.

In embodiments that include a water-gas shift, each shift reactor comprises a catalyst and is configured to operate at a temperature in a range of about 400° F. to 900° F., to react carbon monoxide and steam present in the particulate-free syngas passing through the reactor to produce a shifted syngas with an increased level of hydrogen gas and a decreased level of carbon monoxide. In certain embodiments, multiple shift reactors may be utilized, with one maintained at a higher temperature. Many conventional catalysts can be utilized to facilitate this water-gas shift reaction, including, but not limited to magnetite, Raney copper, as well as other transition metals and transition metal oxides. In certain embodiments, sulfur resistant conventional hydrotreating catalysts may be utilized, such as, for example those comprising Nickel and molybdenum (NiMo) as well as cobalt and molybdenum (CoMo). Preferably, the catalyst is resistant to deactivation by sulfur contaminants present in the particulate free syngas. Such catalysts are conventional and one having skill in the art can implement them in the manner described herein.

The resulting shifted syngas can then be utilized in various ways, such as fuel for a gas turbine as part of an Integrated Gasification Combined Cycle (IGCC) power plant, or as feedstock for chemical manufacturing process or a synthetic natural gas (SNG) production process. Such processes are conventional and outside of the scope of this disclosure. Certain embodiments may additionally comprise recovering carbon dioxide from the shifted syngas, wherein the apparatus utilized for recovery is located downstream from the shift reactor.

For both SNG applications and IGCC applications with carbon capture, the quenching medium introduced via at least one inlet 210 creates steam in situ, thereby significantly reducing the amount of steam that must be added to condition the particulate-free syngas prior to conducting a water-gas shift reaction. For certain embodiments comprising IGCC applications without carbon capture, the particulate-free syngas may be water scrubbed for removal of chlorides, further cooled, de-moisturized and desulfurized. In these embodiments, the process water utilized to quench the raw syngas can be mostly condensed out in a Low Temperature Heat Recovery Unit (LTHRU) as sour water. Water of boiler feed quality is then required to remoisturize the desulfurized syngas before it is used as fuel for gas turbines.

The following examples of certain embodiments of the invention are given. Each example is provided by way of explanation of the invention, one of many embodiments of the invention. These examples are intended to be illustrative of a specific embodiment of the present invention in order to teach one of ordinary skill in the art how to make and use the invention, and the following examples should not be read to limit, or define, the scope of the invention in any way.

EXAMPLE 1

Detailed computer modeling was performed to assess the effect of implementing the inventive systems and processes on overall operational efficiency and cost. The test case was a two-stage gasifier (as described herein) with a capacity of 6,733 short tons per day of petroleum coke as feedstock. The results of the modeling indicated that overall gasifier performance does not appreciably change, and the raw syngas produced from the gasifier is of very similar composition to that shown in Table 1. In fact, most components differed by less than 1% on a mole basis.

The major difference detected was in the steam and water balance of the conventional system versus the system of the current disclosure. Implementing the inventive systems described herein with a direct quench of the near-zero tar syngas to a temperature of 1000° F. resulted in the loss of all the saturated high pressure steam that would otherwise have been produced by the HTHRU as it cooled the near-zero-tar syngas. However, the syngas cooled by direct quench to 1000° F. contained about 56% more steam created in situ than the syngas produced by the conventional system, thereby decreasing by approximately 95% the quantity of high pressure steam that needed to be introduced to moisturize the syngas prior to entering the water-gas shift reactor. Additionally, because no saturated high pressure steam was produced in the HTHRU in this example, the heat that otherwise would have been required to pre-heat boiler feed water and superheat the saturated steam (produced by the HTHRU) was instead utilized to directly generate superheated high pressure steam in situ. The calculated overall loss of superheated, high pressure steam available to the steam turbines in this example equaled approximately 31.8%. However, the power generated by the steam turbines decreased by only 14.6%.

EXAMPLE 2

System reliability (i.e., operational availability) is a crucial factor in determining the commercial viability of gasification systems. Therefore, a detailed comparison was conducted between an embodiment of the systems and processes described herein, and a conventional two-stage gasification system utilizing the EGas™ technology (owned by Lummus Technology Inc.) to calculate any effect on system availability. The test case compared two Integrated Gasification Combined Cycle (IGCC) systems, each system comprising two online gasifiers with no back-up. Preventive maintenance is normally performed every 180 days to inspect and maintain the gasifiers. However, conventional IGCC systems that utilize a HTHRU were determined to require more frequent maintenance, on the order of every 90 days. In this hypothetical scenario, the availability of the inventive system designed as disclosed herein was 6.6% greater than the conventional system design.

EXAMPLE 3

Calculations were performed to determine the economics of implementing the systems and processes described herein. The inventive systems and processes do not require an HTHRU, which is a costly piece of equipment to both build and maintain. A detailed analysis was performed that included the savings in capital expense, expected income tax rate, financial depreciation, and expected inflation rate. The calculated overall savings due to implementing the inventive systems and processes disclosed herein resulted in an internal rate of return of 3.9% over the expected 25 year lifespan of the system.

Definitions

For the purposes of this disclosure, the term "syngas" is synonymous with synthesis gas or synthetic gas, the term "gas" is synonymous with methane, natural gas, as well as gasoline or any other liquid hydrocarbon fuel.

In closing, it should be noted that the discussion of any reference is not an admission that it is prior art to the present invention, especially any reference that may have a publication date after the priority date of this application. At the same time, each and every claim below is hereby incorporated into this detailed description or specification as an additional embodiment of the present invention.

Although the systems and processes described herein have been described in detail, it should be understood that various changes, substitutions, and alterations can be made without departing from the spirit and scope of the invention as defined by the following claims. Those skilled in the art may be able to study the disclosed embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims listed below and their equivalents.

We claim:

1. A two-stage non-catalytic gasification process, comprising:
   (a) introducing a particulate carbonaceous feedstock into a reactor lower section of a two-stage gasification reactor and partially combusting therein with a gas stream comprising an oxygen supply selected from a group consisting of oxygen-containing gas, steam, and mixtures thereof, thereby evolving heat and forming a first product stream comprising synthesis gas and molten slag;
   (b) passing the synthesis gas of step (b) into a reactor upper section of the two-stage gasification reactor and contacting therein with a stream comprising a slurry of particulate carbonaceous feedstock in a liquid carrier, thereby forming a second product stream comprising syngas and solids comprising ash and char;
   (c) passing the second product stream to a reactor that is maintained at a temperature greater than about 1500° F., wherein the syngas resides in the reactor for a time that is sufficient to thermally degrade volatile tars present in the syngas, thereby producing a product comprising a near-zero-tar syngas;
   (d) introducing a water stream and contacting with the near-zero-tar syngas, thereby producing steam and a cooled moisturized syngas, wherein the temperature of the cooled moisturized syngas remains greater than the condensation point of the steam, but less than about 1200° F.; and
   (e) removing residual solids, fines and particulates from the cooled moisturized syngas by directing the cooled syngas through a particulate filtering device, thereby producing a particulate-free syngas.

2. The process of claim 1, further comprising routing the low-particulate syngas to a shift reactor containing at least one catalyst and reacting at least a portion of the carbon monoxide present in the particulate-free syngas of step (e) with the steam produced in step (d) and additional steam produced by injection of water into or immediately upstream from the shift reactor, thereby producing a shifted syngas comprising additional carbon dioxide and hydrogen.

3. The process of claim 1, wherein the temperature of the cooled, moisturized syngas is sufficient to prevent the condensation of one or more components of the cooled, moisturized syngas, wherein condensation of the one or more components would cause them to deposit on the particulate filtering device of step (e).

4. The process of claim 3, wherein the one or more components are selected from the group consisting of: water, ash constituents, and residual volatile tars.

5. The process of claim 1, wherein the water stream of step (d) is of lower quality than boiler feed water.

6. The process of claim 1, wherein the residual solids, fines and particulates of step (e) are returned to the reactor lower section.

7. The process of claim 1, wherein the temperature of the cooled moisturized syngas of step (e) is between about 550° F. and about 1200° F.

8. The process of claim wherein the temperature of the cooled moisturized syngas of step (e) is between about 600° F. and about 1100°F.

9. The process of claim 1, wherein the temperature of the cooled moisturized syngas of step (e) is between about 450° F. and about 1000° F.

10. The process of claim 1, wherein the temperature of the cooled moisturized syngas of step (e) is between about 550° F. and about 950° F.

11. The process of claim 1, wherein the temperature of the cooled moisturized syngas of step (e) is between about 600° F. and about 950° F.

12. The process of claim 1, further comprising recovering carbon dioxide from the particulate-free syngas.

13. The process of claim 2, wherein at least a portion of the shifted syngas is used as feedstock for a chemical or fuels manufacturing process.

14. The process of claim 2, further comprising recovering carbon dioxide from the shifted syngas.

15. A system for the two-stage gasification of a particulate carbonaceous feedstock, comprising:
(a) a gasification reactor comprising a reactor upper section and a reactor lower section adapted for operation at pressures greater than about 100 psig and temperatures greater than about 2000° F., wherein the reactor lower section is adapted for introducing the particulate carbonaceous feedstock and an oxygen containing gas or steam and partially combusting therein to form mixture products, wherein the gasification reactor is adapted for conveying the mixture products from the lower reactor section to the upper reactor section; wherein said reactor upper section is adapted for introducing additional particulate carbonaceous feedstock in a liquid carrier and combining with the mixture products to endothermically produce a product stream comprising syngas, char, ash and volatile tars;
(b) a residence vessel located downstream from the gasification reactor, wherein the residence vessel is adapted for accepting the product stream and operating at a pressure greater than about 100 psig and a temperature greater than about 1500° F., wherein the residence vessel is adapted for providing sufficient residence time for the product stream conveyed therethrough to allow thermal degradation of a majority of the volatile tars present in the reduced particulate syngas and thereby produce a near-zero tar syngas;
(c) a conduit comprising at least one inlet that is located immediately downstream from the residence vessel and connected to the residence vessel, wherein the at least one inlet is adapted for receiving the near-zero-tar syngas, introducing a quenching medium comprising water and mixing with the near-zero tar syngas conveyed therethrough;
(d) a particulate filtering device located immediately downstream from the conduit and connected to the conduit, wherein the particulate filtering device is adapted for receiving a cooled, moisturized syngas in a range of about 550° F. and about 1200° F., and removing residual solids, fines and particulates from the cooled, moisturized syngas passing therethrough, thereby producing a particulate-free syngas.

16. The system of claim 15, additionally comprising a shift reactor located downstream from the particulate filtering device and connected to the particulate filtering device, wherein the shift reactor comprises a catalyst and is adapted for operating at a temperature in a range of about 400° F. to 900° F., wherein the shift reactor is adapted for reacting carbon monoxide and steam present in the particulate-free syngas passing therethrough, thereby producing a shifted syngas.

17. The system of claim 16, further comprising an apparatus for recovering carbon dioxide from the particulate-free shifted syngas, wherein the apparatus is located downstream from the shift reactor.

18. The system of claim 15, wherein the particulate filtering device of part (d) is a candle filter comprising elements that are adapted for operation at a temperature ranging up to about 1200° F.

* * * * *